Feb. 25, 1958     W. R. FISCHER     2,825,025
METHOD OF TESTING THE CONDUCTIVITY OF
AN ELECTRICAL CIRCUIT
Filed Dec. 12, 1955
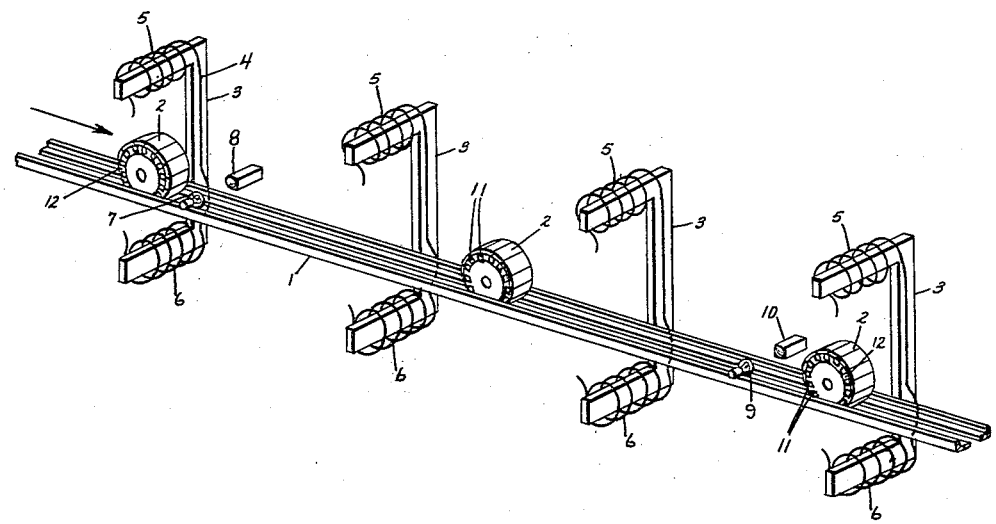
Inventor:
William R. Fischer,
by *Robert G. Irey*
His Attorney.

United States Patent Office 2,825,025
Patented Feb. 25, 1958

2,825,025

METHOD OF TESTING THE CONDUCTIVITY OF AN ELECTRICAL CIRCUIT

William R. Fischer, De Kalb, Ill., assignor to General Electric Company, a corporation of New York Application December 12, 1955, Serial No. 552,331

4 Claims. (Cl. 324—51)

This invention relates to testing techniques, and more particularly to a method of testing the conductivity of an electrical circuit effectively and with a minimum of complexity.

The use of highly automatic high-production assembly systems makes it desirable to provide equally automatic and rapid methods for effecting the necessary testing of the product. In the case of electric motors of the induction type, the rotor member generally includes a plurality of axially extending conductors which are connected together by end rings at each end so as to form a closed or complete circuit. The performance of the motor of which the rotor member is a part is dependent to a considerable extent upon the degree of conductivity of the closed circuit of the rotor conductors, and it is therefore necessary that certain standards of conductivity be maintained. It is most desirable to provide a test for the conductivity of the rotor member conductors which will be simple and economical and which will lend itself to the highly automatic processes of production which are rapidly becoming more and more universally utilized.

It is, therefore, an object of this invention to provide a method of testing the conductivity of a complete electrical circuit which will incorporate the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broadest aspect, the invention provides a method of testing the conductivity of a complete electrical circuit which includes a first step of subjecting the construction including the circuit to a predetermined force to move it through a magnetic field. Movement of the conductors forming the circuit through the field generates an electromotive force in the circuit. The electromotive force, in turn, will produce a current in the circuit which is dependent upon the resistance of the circuit, that is, the higher the conductivity of the circuit, the higher will be the current therein. The presence of current in the conductors which form the circuit produces a force, is proportional to the current, which acts upon the conductors forming the circuit. The second step of the testing method involves the measurement of time consumed for the construction to move a predetermined distance through the magnetic field. The final step of comparing the time so consumed to the time for the construction to move the predetermined distance without the influence of a magnetic field will show the magnitude of the force resulting from the current flowing within the circuit and will thus indicate the conductivity of the circuit.

In the drawing, the single figure is a view in perspective of equipment suitable for carrying out the steps of the improved testing method of this invention.

Referring now to the drawing, there is shown a track 1 arranged with a predetermined degree of inclination so as to subject a cylindrical object, such as an induction motor rotor member 2, to gravitational force to cause it to move in the direction of the arrow when placed on the track. The scope of the invention would also, of course, include any substantially constant application of force to cause the desired movement. A magnetic field is set up by any desired means such as, for instance, magnetic core members 3 with conductors 4 arranged on them to form poles 5 and 6 of opposite polarity. Current, either direct or alternating, is impressed across each conductor 4 from any desired source (not shown). It will, of course, be understood that the magnetic field may be set up by means of permanent magnets as well as by electromagnetic means, and that the electromagnetic structure has been described for purposes of illustration only.

Means for timing the passage of a rotor member 2 over a predetermined length of track 1 are provided; there may be, as shown, a photoelectric arrangement whereby an electric bulb 7 emits light which is sensed by a photoelectric device 8 near the top of the track 1, and a similar bulb 9 is in similar relationship with a second photoelectric device 10 near the bottom of track 1. Passage of a solid object between the bulb 7 and the device 8 will cause the start of a timing action by any desired apparatus (not shown) and the timing action may then be stopped when the member 2 passes between bulb 9 and device 10.

Each rotor member 2 has a plurality of conductors 11 extending in an axial direction adjacent the periphery. All of the conductors 11 are connected together at each end by means of end ring structures 12 so that a complete and closed circuit is formed. A rotor member having such a construction is generally termed a squirrel-cage rotor.

As each rotor member 2 rolls down track 1 through the magnetic field, the conductors 12 move with respect to the magnetic field so as to induce an electromotive force in the closed circuit which they form. The amount of this force is determined by the strength of the magnetic field and the speed with which the conductors move with respect thereto. Therefore, for a predetermined strength of magnetic field, a constant incline, and rotor members of like size and weight, the electromotive force produced will be substantially constant for each rotor member 2. The degree of conductivity, or lack of resistance, of the circuit formed by the conductors 11 and end rings 12 determines the amount of current which the electromotive force will pass through the circuit. The current in the conductors creates a magnetic field of its own about each conductor and, in combination with the magnetic field provided between poles 5 and 6, exerts on the conductor a force which is proportional to the current. The greater the force exerted, the greater will be the deviation from the time that a rotor member 2 would take to roll the distance without the presence of a magnetic field. Thus, by letting a rotor member roll down track 1 without applying a magnetic field, and measuring the time differential between the time consumed for that run and the time consumed for the run through the magnetic field, the quality of conductivity of the conductors can be checked. This concept can be extended to running a test on rotor members with conductors which are respectively known to have minimum and maximum acceptable conductivity, and then rejecting all like rotor members which pass through the field faster or slower than the rotor members of known limiting conductivity. In this manner, a standard may be set without regard to the absolute value of conductivity of the conductor circuit.

It will be seen that this invention provides means for determining the conductivity of a complete electrical circuit such as, for instance, the closed conductive circuit in an induction motor rotor, which are simple and reliable, and which lend themselves to automatic production methods in that a continual flow of rotors may be tested without any delay whatsoever.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. A method of testing the conductivity of a complete electrical circuit formed of nonmagnetic material comprising the steps of subjecting the construction including said circuit to a predetermined force to move it through a magnetic field thereby to generate an electromotive force in said circuit, measuring the time consumed for said construction to move a predetermined distance through said field, and comparing the time so consumed to the time for such a construction to move said predetermined distance without the influence of a magnetic field.

2. A method of testing the conductivity of a complete electrical circuit formed of nonmagnetic material comprising the steps of causing the construction including said circuit to be moved by gravitational force through a magnetic field thereby to generate an electromotive force in said circuit, measuring the time consumed for said construction to move a predetermined distance through said field, and comparing the time so consumed to the time for such a construction to move said predetermined distance without the influence of a magnetic field.

3. A method of testing the conductivity of the conductors of nonmagnetic material arranged in a complete electrical circuit in a substantially cylindrical dynamoelectric machine core member comprising the steps of placing said core member on an incline, causing it to roll by gravitational force through a magnetic field, measuring the time consumed for said construction to move a predetermined distance through said field, and comparing the time so consumed to the time for such a member to move said predetermined distance without the influence of a magnetic field.

4. A method of testing the conductivity of the nonmagnetic circuit of a squirrel cage rotor member comprising the steps of placing said rotor member on an inclined track, providing a magnetic field over at least a part of the length of said track, causing said rotor member to roll freely down said track through said field, measuring the time consumed for said rotor member to move a predetermined distance through said field, and comparing the time so consumed to the time for a like rotor member previously tested and found to have conductors of limiting acceptable conductivity to move said predetermined distance through said magnetic field.

References Cited in the file of this patent

UNITED STATES PATENTS

| | | |
|---|---|---|
| 1,103,358 | Hess | July 14, 1914 |
| 2,640,100 | Packer | May 26, 1953 |